W. FULLARD.
ROASTER FOR COFFEE AND OTHER MATERIALS.
APPLICATION FILED FEB. 13, 1919.
1,319,764.
Patented Oct. 28, 1919.
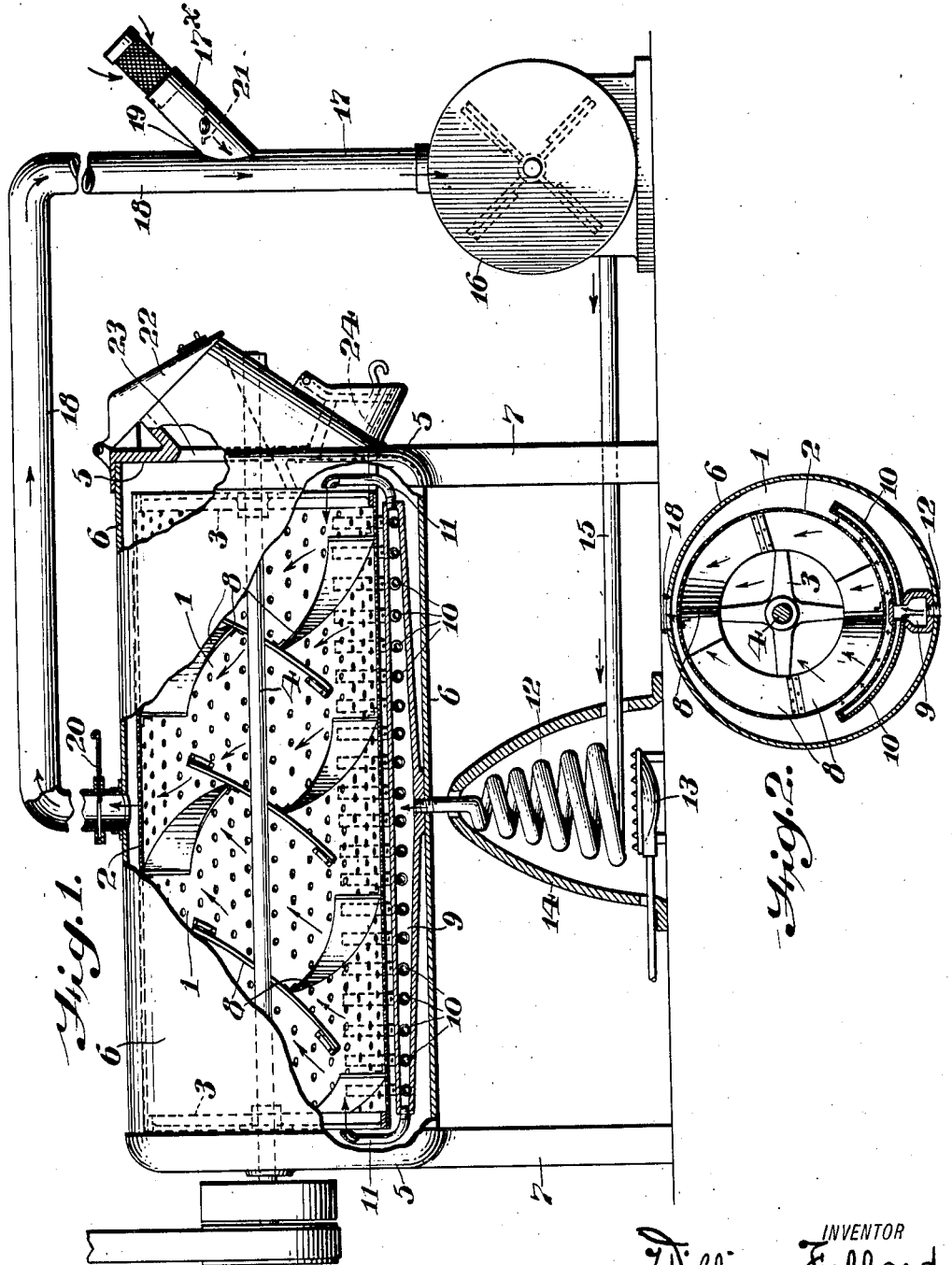
INVENTOR
William Fullard.
BY Wiedersheim + Fairbanks.
ATTORNEYS.

UNITED STATES PATENT OFFICE.

WILLIAM FULLARD, OF BEVERLY, NEW JERSEY.

ROASTER FOR COFFEE AND OTHER MATERIALS.

1,319,764. Specification of Letters Patent. Patented Oct. 28, 1919.

Application filed February 13, 1919. Serial No. 276,700.

*To all whom it may concern:*

Be it known that, I, WILLIAM FULLARD, a citizen of the United States, residing at Beverly, county of Burlington, State of New Jersey, have invented a new and useful Roaster for Coffee and other Materials, of which the following is a specification.

My invention consists of a roaster for coffee and other materials in which provision is made for subjecting the materials to the action of hot fresh atmospheric air, thus effectively roasting the same with perfectly dry and pure fresh air in germless condition, without contact of the products of combustion.

The invention is satisfactorily illustrated in the accompanying drawings, but the important instrumentalities thereof may be varied, and so it is to be understood that the invention is not limited to the specific details shown and described, as long as they are within the spirit or scope of the claims.

Figure 1 represents a side elevation partly broken away of a coffee roaster embodying my invention.

Fig. 2 represents a transverse section thereof.

Similar numerals of reference indicate corresponding parts in the figures.

Referring to the drawings.

1 designates the roasting chamber, the same consisting of a cylinder having a perforated wall 2 which is attached at its ends, which are open, to the spiders 3, the latter being connected with the driving shaft 4 of said cylinder which shaft is mounted on the concave heads 5, the latter being adapted to inclose the open ends of said chamber 1 and the adjacent open ends of the jacket or casing 6, which latter surrounds said chamber and constitutes the exterior inclosing member of the device, said heads being supported on the standards 7, and said shaft 4 being adapted to receive rotation by any suitable power applied thereto.

Within the chamber 1 are the spiral blades 8 which are secured to the same so as to rotate therewith and serve to agitate the coffee and turn and overturn the same so as to effectively subject it to the roasting operation.

Within the jacket 6 at the lower portion thereof is the manifold 9 from the sides of which extend the perforated or jet pipes 10 which are adapted to direct hot atmospheric air into the chamber 1 through the periphery thereof.

Connected with the ends of said manifold are the branch pipes 11 whose upper terminals enter the open ends of the chamber 1 through the heads 5 so as to direct hot atmospheric air into said chamber through the spiders 4, said chamber thus being doubly supplied with such air.

12 designates a receiver for fresh atmospheric air, and a heater for the latter, the same being inclosed in the casing 14, said receiver being of the form of a spiral coil of pipe so as to provide a large heating surface. The upper terminal of said coil passes through the top of said casing, the bottom of the jacket 6, and joins the bottom of the manifold, so as to communicate with the interior of the latter, and so direct the air from said receiver into said manifold.

Below the coil is the heater 13 of approved form, the products of combustion of the same being directed against said coil, thus highly heating the latter, the casing 14 forming an inclosure for the coil for evident purposes.

The pipe of the receiver 12 is continuous of the air conveying pipe 15 which latter extends from the blower 16. The casing of the latter has connected with it the pipe 17, a portion of which has a branch 17× which is in direct communication with the atmosphere.

Connected with the top of the jacket 6 and opening into the interior thereof is the outlet pipe 18 for vapor from the chamber 1, said pipe joining the pipe 17 and being confluent therewith as at 19.

The pipe 18 is provided with the damper 20 and the branch of the pipe 17 is provided with the damper 21, both for evident purposes.

On one of the heads 5 is the feed chute 22 which opens as at 23 into the adjacent end of the jacket 6 and chamber 1, the outer end of said chute being covered by the cap 22 which prevents the escape of heat from said chamber and jacket but which may be raised to uncover said chute in order to feed said cylinder with green coffee, said chute having on its lower end the spout 24 which is provided with a suitable cover which may be raised or opened and permits the roasted coffee to flow from said chamber, and thus clear the latter of its contents.

It will be seen that fresh atmospheric air may be drawn into the blower through the pipe 17 and driven into the pipe 15 and consequently into the coil 12 where it is highly heated and so rendered germless, in which condition it is directed into the manifold and from thence in a large volume into the roasting chamber through the side and ends of the latter.

As the chamber 1 rotates the coffee therein is agitated and turned and overturned and so is thoroughly subjected to the heat injected into said chamber by the action of the blower 16, it being seen that the coffee is roasted by pure hot fresh atmospheric air in an effective manner.

As the vapors and spent hot air rise in the chamber 1 and jacket they are drawn into the pipe 18 and directed by the latter into the pipe 17 when said vapors and air commingle with the fresh atmospheric air entering the pipe 17 from the branch 17*, and all are directed into the casing of the blower and forced by the latter into the coil 12 when the vapors are reheated and united with another volume of fresh atmospheric air which is also heated in said coil and so the chamber 1 receives constant supplies of pure dry hot atmospheric air to continuously effect the roasting of the coffee with the same.

When the roasting is effected the coffee may be removed, and the chamber 1 re-fed with green coffee, as already referred to, when the roasting of the latter may be effected as before.

Attention is directed to the fact that the products of combustion of the heating device 13 which may be of any form of a stove, do not enter the roasting chamber, and so the material in the latter is not tainted or flavored by said products, nor made liable to be scorched or burned by the direct impact of such products, as the latter escape into the atmosphere.

Having thus described my invention what I claim as new and desire to secure by Letters Patent, is:—

1. In a roaster of the character stated, a roasting chamber, means for rotating said chamber, a stationary manifold adjacent to said chamber, a conductor for air connected with said manifold adapted to direct the air from said manifold into said chamber, a receiver for air in communication with said manifold, a heater for said receiver, and means for supplying said receiver with atmospheric air under pressure and preventing the products of combustion of said heater from entering said manifold and roasting chamber.

2. In a roaster of the character stated, a roasting chamber, means for rotating the same, said chamber having a perforated wall and an open end, a stationary manifold adjacent to said chamber adapted to receive air, a conductor for air connected with said manifold adapted to direct air therefrom into said chamber, and means for heating atmospheric air and supplying it to said manifold under pressure.

3. In a roaster for coffee, etc., a roasting chamber, means for rotating the same, a jacket inclosing said chamber, a manifold in said jacket adjacent to said chamber, means for supplying said manifold with heated atmospheric air, and a conductor for the said heated atmospheric air leading from said manifold adapted to discharge the same into said roasting chamber.

4. In a roaster for coffee, etc., a receiver for air, means for supplying the same with atmospheric air under pressure, a heating device for said receiver, a manifold with which said receiver is in communication, a roasting chamber, means for rotating the latter, a jacket adapted to inclose said chamber, said manifold being contained in said jacket, and a conductor for the air of said receiver leading from said manifold adapted to direct the same into said chamber.

5. In a roaster of the character stated, a roasting chamber, means for rotating the same, an inclosing jacket for said chamber, means for heating atmospheric air, a manifold adapted to receive said air, and a conductor for said air extending from said manifold in communication with the interior of said chamber.

6. In a roaster of the character stated, a roasting chamber, the same having a perforated wall and an open end, means for rotating said chamber, an inclosing jacket for said chamber, an air receiving manifold in said jacket adjacent to said chamber, a conductor for the air of said manifold adapted to direct the air into said chamber through the perforated wall and open end thereof, and means for heating atmospheric air and directing it into said manifold under pressure.

7. In a roaster of the character stated, a roasting chamber, said chamber having a perforated wall and an open end, an inclosing jacket therefor, a shaft for said chamber, means for rotating said shaft, caps on which said shaft is mounted, and in which the ends of said jacket are fitted, an air receiving manifold in said jacket adjacent to said chamber, an air conductor leading from said manifold to the perforated wall and through said caps into the open end of said chamber, and means for heating atmospheric air directing it into said manifold under pressure.

8. In a roaster of the character stated, a roasting chamber, means for rotating the same, an inclosing jacket for said chamber the same being in communication with the interior of said chamber, an air receiving manifold in said jacket, a conductor for the air from said manifold to the interior of said chamber, means for heating atmospheric air and directing it into said manifold, and a conveyer for vapor in the roasting chamber adapted to lead said vapor to the receiver of the atmospheric air to commingle with the latter.

WILLIAM FULLARD.

Witnesses:
JOHN A. WIEDERSHEIM,
N. BUSSINGER.